United States Patent [19]
Noe

[11] Patent Number: 6,132,687
[45] Date of Patent: Oct. 17, 2000

[54] HORIZONTAL AMMONIA CONVERTER ADAPTED FOR HIGH ACTIVITY CATALYST

[75] Inventor: Stephen Allen Noe, Tomball, Tex.

[73] Assignee: Kellogg Brown & Root, Inc., Houston, Tex.

[21] Appl. No.: 09/082,890

[22] Filed: May 21, 1998

[51] Int. Cl.[7] .................................. B01J 8/04; C01C 1/04
[52] U.S. Cl. ..................... 422/148; 422/193; 422/203; 422/191
[58] Field of Search ..................... 422/148, 193, 422/190, 203, 191, 213; 423/360, 361

[56] References Cited

U.S. PATENT DOCUMENTS

| | | | |
|---|---|---|---|
| 4,163,775 | 8/1979 | Foster et al. | 423/363 |
| 4,452,760 | 6/1984 | Peterson et al. | 422/148 |
| 4,600,571 | 7/1986 | McCarroll et al. | 423/363 |
| 4,696,799 | 9/1987 | Noe | 422/148 |
| 5,846,507 | 12/1998 | Liu et al. | 423/362 |

FOREIGN PATENT DOCUMENTS 1248327  1/1989  Canada.
WO95/32798  12/1995  WIPO.

*Primary Examiner*—Marian C. Knode
*Assistant Examiner*—Susan Ohorodnik
*Attorney, Agent, or Firm*—Kellogg Brown & Root, Inc.

[57] ABSTRACT

A method for modifying a standard two-bed horizontal ammonia converter to provide increased conversion and/or production capacity by placing the first secondary catalyst bed of the existing converter in parallel flow with the existing primary catalyst bed and replacing magnetite catalyst in the second secondary catalyst bed with high activity ruthenium-on-carbon catalyst.

5 Claims, 3 Drawing Sheets

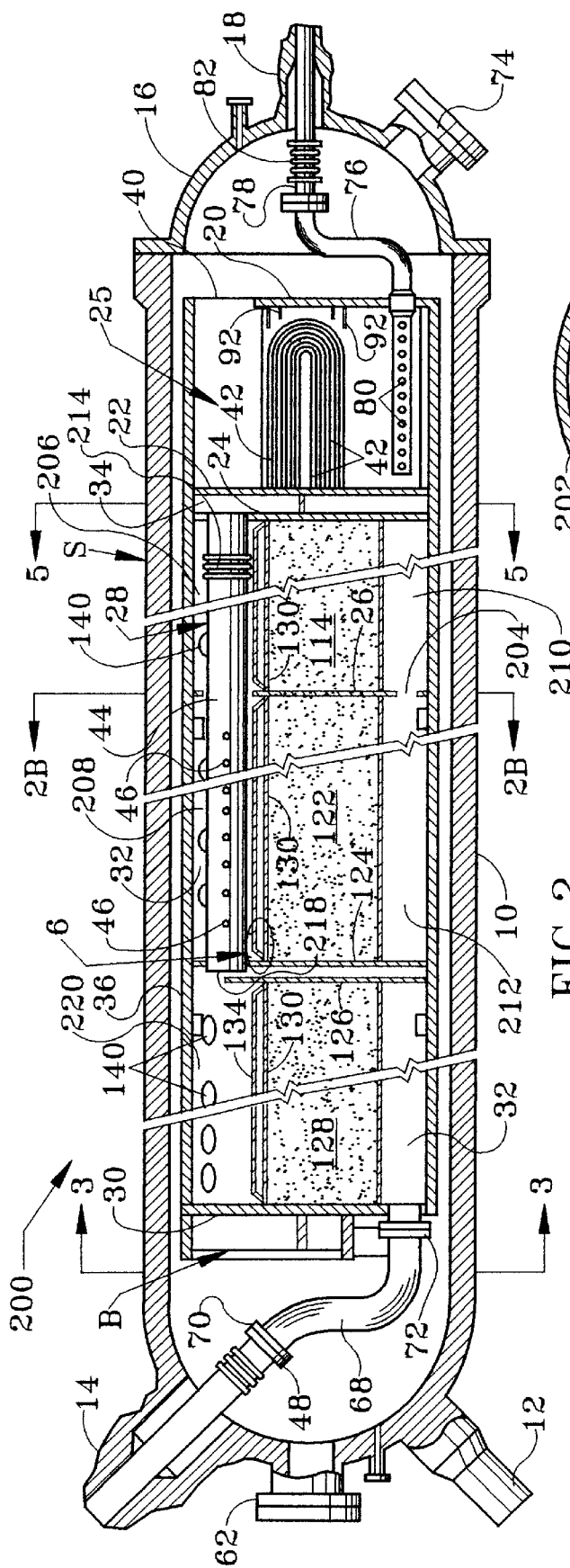

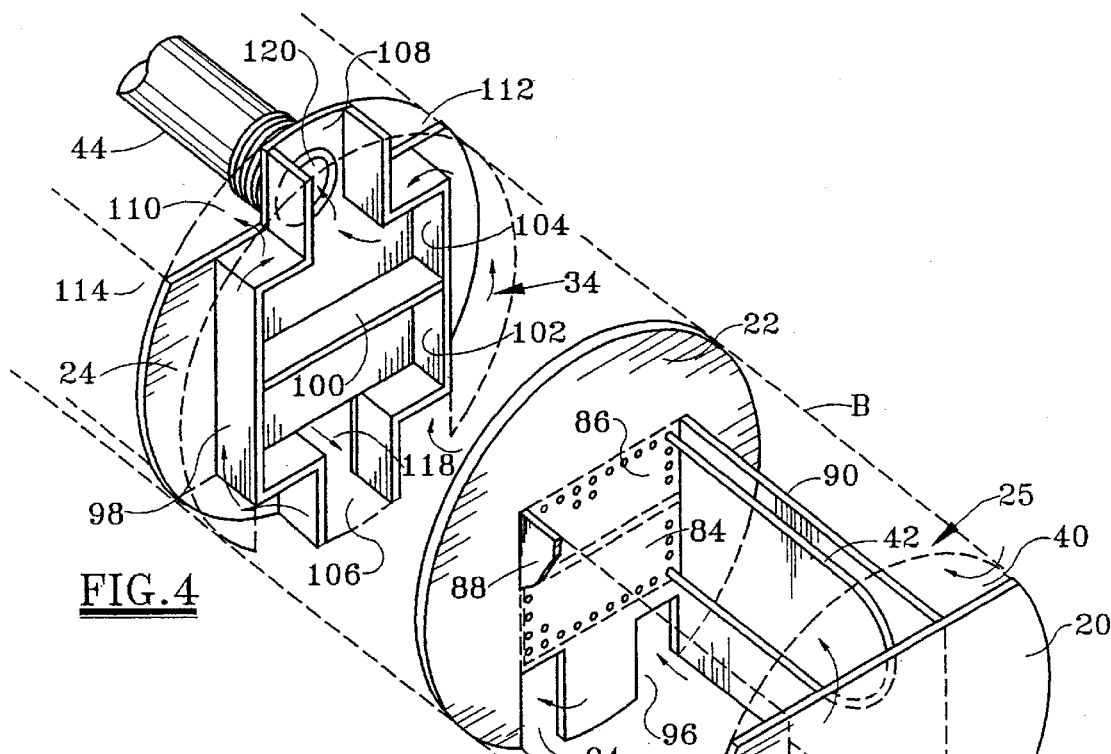

HORIZONTAL AMMONIA CONVERTER ADAPTED FOR HIGH ACTIVITY CATALYST

FIELD OF THE INVENTION

This invention relates to horizontal ammonia converters, and especially to a horizontal ammonia converter adapted to use high activity catalyst.

BACKGROUND OF THE INVENTION

The present invention is directed to multi-bed horizontal ammonia converters such as the converter described in U.S. Pat. No. 4,452,760 to Peterson et al. which is hereby incorporated herein by reference. Many of these reactors are in use operating on a magnetite catalyst. It is frequently desired to modify the Peterson et al. reactor for increased ammonia conversion.

With reference to the Peterson et al. ammonia converter shown in FIGS. 1 and 1A, the outer shell S is a cylindrical pressure vessel which includes a main body 10 having an inlet 12 and an outlet 14 at one end. A head 16 is removably attached to main body 10 and has an exchanger bypass 18. An inner shell or basket B is removably positioned within outer shell S. The inner shell B is a cylindrical vessel which is divided into sections. The end wall 20 and a first wall 22 define a heat exchange section 25 of shell B. A second wall 24 and a third wall 26 define a first catalyst section 28. A second catalyst bed section is defined between third wall 26 and the outer end wall 30 of shell B. A gas transfer section 34 is disposed between first wall 22 and second wall 24.

The synthesis gas enters the outer shell S of the Peterson et al. reactor through inlet 12. The gas is at a temperature below the desired reaction temperature, but maintains the outer shell S at low temperatures as it passes through the annular space 36 (shown enlarged in FIG. 1A) between the outer shell S and the inner shell B. Preferably, the gas is introduced through inlet 12 at one end and flows to the other end where it passes through opening 40 in end wall 20. Opening 40 is at the top of end wall 20 where the gas enters the heat exchange section 25 of inner shell B. The gas passes downwardly over a plurality of tubes 42 heating the gas to reaction temperatures. As best seen in FIG. 1A, the gas enters the bottom of gas transfer section 34 and passes to the top where it enters the first catalyst bed section 28 above the horizontal bed of catalyst. As the gas passes through the catalyst, the hydrogen and nitrogen react to form ammonia and due to the exothermic reaction, the product gases are hotter than the entering gas. The product gas contains a mixture of ammonia and unreacted hydrogen and nitrogen. The product gas passes through gas transfer section 34 where it enters the inside of tubes 42. As the product gas passes through the tubes 42 it is cooled in heat exchange section 25. The cooled product gas then re-enters gas transfer section 34 where it enters pipe 44 which extends from gas transfer section 34, through first catalyst bed section 28 and passes through openings 46 in pipe 44 above a horizontal bed of catalyst in second catalyst bed section 32. In the Peterson et al. reactor it is preferred that the second catalyst bed section 32 comprises two horizontal beds of catalyst through which the product gas from the first bed of catalyst passes. Preferably, the second catalyst bed section 32 is in two sections formed by partial wall 124 which extends above catalyst bed 122 and partial wall 126 which extends below adjacent catalyst bed 128. Further ammonia is produced in the catalyst beds 122 and 128 and again the product gas is heated. The hot reaction product gas then passes through end wall 30 through an outlet pipe 48 where it passes through outlet 14.

SUMMARY OF THE INVENTION

The present invention is a horizontal ammonia conversion reactor which can be made by new fabrication or modification of the Peterson et al. reactor. The horizontal ammonia conversion reactor of this invention uses a combination of magnetite and high activity catalyst, and has a higher conversion rate than the magnetite-based Peterson et al. reactor.

In one aspect, the present invention provides a horizontal multi-bed ammonia converter. The converter has a horizontal cylindrical outer shell having a removable head at one end thereof. A horizontal basket has a horizontal cylindrical inner shell having fore and aft end walls and defines an annular passage between the inner and outer shells. A gas inlet through the outer shell is in fluid communication with the annular passage. A first transverse partition in the inner shell is longitudinally spaced from the fore wall to define a heat exchange section therebetween. The heat exchange section has a plurality of tubes passing therethrough and a tube sheet which is adjacent to the first transverse partition. The heat exchange section includes a shell-side fluid inlet and outlet for directing gas externally across the tubes. The shell-side fluid inlet is in fluid communication with the annular passage. A second transverse partition is longitudinally spaced from the first transverse partition to define a first primary catalyst bed therebetween which is adapted for downward flow of gas therethrough. A third transverse partition is longitudinally spaced between the second transverse partition and the aft wall to define a second primary catalyst bed between the second and third transverse partitions and a secondary catalyst bed between the third partition and the aft wall. The second primary catalyst bed and the secondary catalyst bed are adapted for downward flow of gas therethrough. First upper and lower plenums are formed above and below the primary catalyst beds and are defined by the inner shell and respective tops and bottoms of the primary catalyst beds. Second upper and lower plenums are formed above and below the secondary catalyst bed and are defined by the inner shell and a respective top and bottom of the secondary catalyst bed. A first passageway is formed from the shell-side fluid outlet through the first partition to the first upper plenum. A second passageway is formed from the first lower plenum through the first partition to a tube-side fluid inlet of the heat exchange section. A third passageway is formed from a tube-side fluid outlet of the heat exchange section through the first, second and third partitions to the second upper plenum. A gas outlet is provided in fluid communication with the second lower plenum.

The ammonia converter can include distributors for introducing gas from the first and second upper plenums respectively into the primary and secondary catalyst beds. The ammonia converter can include a bypass line for introducing gas directly into the heat exchange section adjacent to the shell-side fluid outlet. The secondary catalyst bed preferably comprises high activity catalyst.

The third passageway can include a conduit disposed in the first upper plenum and passing through the second and third partitions into the second upper plenum. The first upper and lower plenums can include openings through the second partition. The first partition can include horizontal and vertical cruciform walls, an outer flow path from the shell-side fluid outlet around the cruciform wall to the first upper plenum, a lower flow path inside the cruciform wall from the first lower plenum to the tube-side inlet, and an upper flow path inside the cruciform wall from the tube-side outlet to the conduit.

In another aspect, the present invention provides a method for retrofitting a horizontal multi-bed ammonia converter as disclosed in Peterson et al. Before retrofit, the ammonia converter comprises: (1) a horizontal cylindrical outer shell having a removable head at one end thereof; (2) a horizontal basket comprising a horizontal cylindrical inner shell having fore and aft end walls and defining an annular passage between the inner and outer shells; (3) a gas inlet through the outer shell in fluid communication with the annular passage; (4) a first transverse partition longitudinally spaced from the fore wall to define a heat exchange section therebetween having a plurality of tubes passing therethrough and a tube sheet adjacent to the first transverse partition, said heat exchange section having a shell-side fluid inlet and outlet for directing gas across the tubes, the shell-side fluid inlet in fluid communication with the annular passage; (5) a second transverse partition longitudinally spaced from the first transverse partition to define a first catalyst bed therebetween adapted for downward flow of gas therethrough; (6) a third transverse partition longitudinally spaced between the second transverse partition and the aft wall to define a second catalyst bed between the second and third transverse partitions and a third catalyst bed between the third partition and the aft wall, the second and third catalyst beds adapted for downward flow of gas therethrough; (7) first, second and third upper plenums above and below the respective catalyst beds defined by the inner shell and respective tops and bottoms of the catalyst beds; (8) a first passageway from the shell-side fluid outlet through the first partition to the first upper plenum; (9) a second passageway from the first lower plenum through the first partition to a tube-side fluid inlet of the heat exchange section; (10) a third passageway from a tube-side fluid outlet of the heat exchange section through the first and second partitions to the second upper plenum; (11) a fourth passageway from the second lower plenum through the third partition to the third upper plenum; and (12) a gas outlet in fluid communication with the third lower plenum. The retrofitting method comprises the steps of: (a) cutting flow windows through the second partition to establish fluid communication between the first and second upper plenums and the first and second lower plenums; (b) sealing off the fourth passageway; (c) extending the third passageway through the third transverse partition to be in fluid communication with the third upper plenum, and sealing off the third passageway with respect to the second upper plenum; and (d) filling the third catalyst bed with high activity catalyst.

The method can also include the step of (e) closing off holes in the distributor at the top of the first catalyst bed, e.g. by applying blanking strips, so that the hole area in the distributor, per linear foot of length of the first catalyst bed, is substantially the same as the hole area in a distributor at the top of the second catalyst bed per linear foot of length of the second catalyst bed. The method preferably includes filling the first and second catalyst beds with 1.5 to 3 mm magnetite catalyst. The bed supports at the bottom of the first, second and/or third catalyst beds can be overlaid with smaller screens as needed.

Step (c) preferably includes adding a short pipe extension to the third passageway, cutting a hole in the third transverse partition to receive the short pipe extension, and seal-welding the short pipe extension to the third transverse partition.

BRIEF DESCRIPTION OF THE DRAWINGS

FIG. 2 is a sectional view of the horizontal converter of the present invention.

FIG. 2A is a schematic sectional view showing the gas flow through the converter of the present invention.

FIG. 2B is a sectional view taken along the lines 2B—2B of FIG. 2.

FIG. 3 is a sectional view taken along the lines 3—3 of FIGS. 1 and 2 showing one end of the inner cylindrical shell.

FIG. 4 is an expanded, isometric view of the gas transfer section, separated to show the details of this section within the inner cylindrical shell.

FIG. 5 is a sectional view taken along the lines 5—5 of FIGS. 1 and 2.

FIG. 6 is a sectional view of a portion of the distribution plates of the catalyst bed shown in section 5 of FIGS. 1 and 2.

DESCRIPTION OF THE INVENTION

Figure 1:
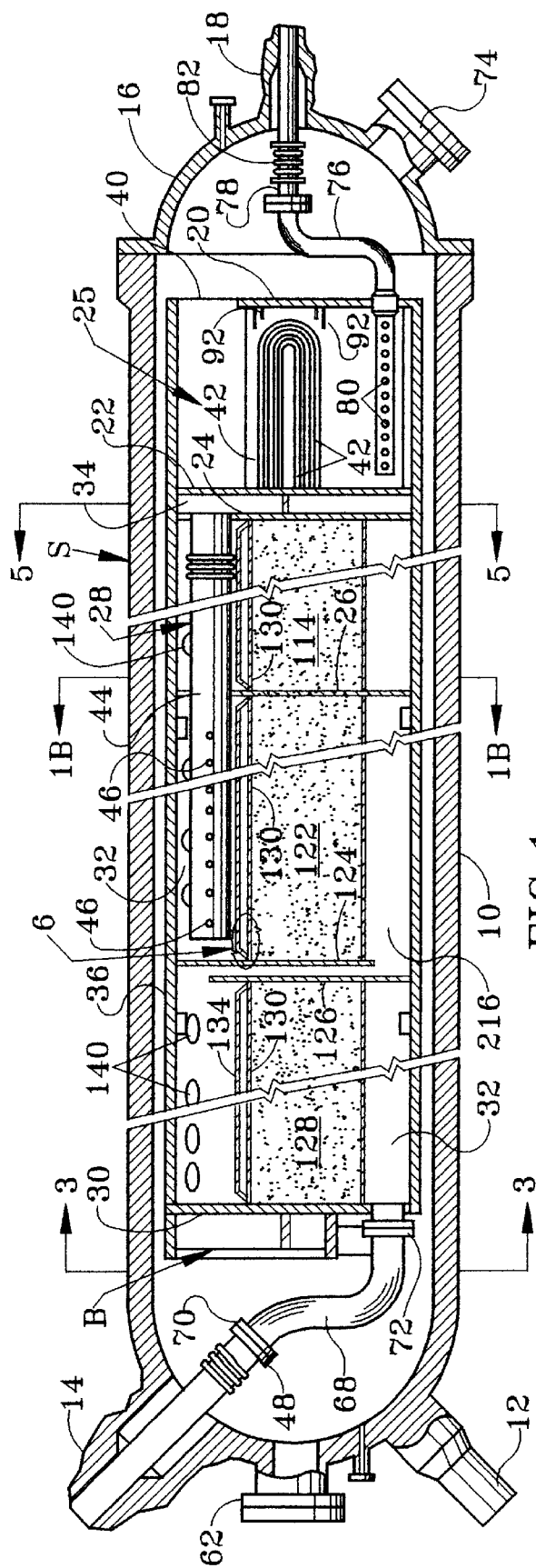
FIG. 1 (prior art) is a sectional view of the horizontal converter of Peterson et al.
Figure 1B:
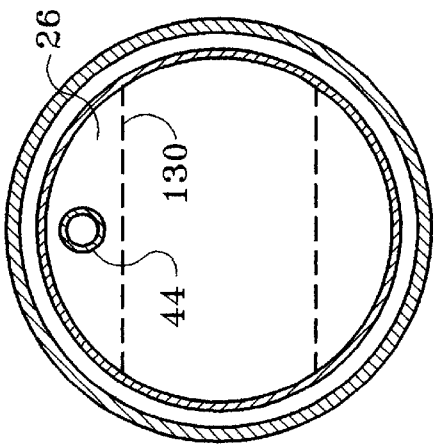
FIG. 1B (prior art) is a sectional view taken along the lines 1B—1B of FIG. 1.
Figure 1A:
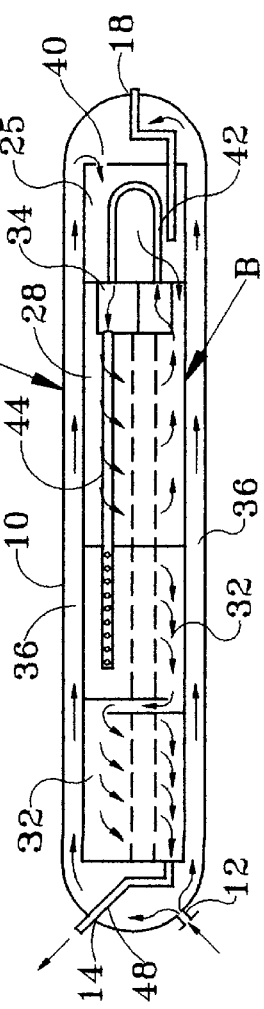
FIG. 1A (prior art) is a sectional schematic view showing the gas flow through the converter of Peterson et al.

For illustrative purposes, the converter of the present invention is described herein relative to its use in the catalytic synthesis of ammonia from nitrogen and hydrogen. It is understood that the use of the present converter for ammonia is not necessarily limited to the synthesis of ammonia. In the synthesis of ammonia, a synthesis gas which is predominantly hydrogen and nitrogen, usually in a 3:1 molar ratio, is passed over an ammonia synthesis catalyst, the pressures of which range from 50 to 400 atm. The commercial ammonia synthesis catalysts now employed are either the so-called "magnetite catalysts" made of iron or modified iron which operate at temperatures between 250° and 540° C., or the so-called "high activity catalysts" comprising a platinum group metal such as ruthenium on a graphite-containing carbon support as described in U.S. Pat. Nos. 4,055,628, 4,122,140 and 4,163,775, all of which are incorporated herein by reference. The ammonia reaction is exothermic and the converter of the present invention is designed for the removal or handling of the exothermic heat produced in the reaction by an interstage cooler.

The reactor of the present invention can be made by new construction, but is more preferably made by modifying the Peterson et al. device. To modify the Peterson et al. reactor to make the reactor 200 (see FIG. 2) according to the present invention, flow windows 202 and 204 (see FIG. 2B) are cut in the third wall 26 to connect plenums 206, 208 above the respective first catalyst bed 114 and second catalyst bed 122, and to connect plenums 210, 212 below the respective first catalyst bed 114 and second catalyst bed 122. The flow window 202 preferably circumscribes the pipe 44 to avoid the need for adding another expansion joint 214 to the pipe 44. The flow window 216 of the Peterson et al. reactor is sealed off so that partial wall 124 in the Peterson et al. reactor becomes a complete wall corresponding to the third transverse partition in the present reactor 200. Thus, gas enters from the respective connected plenums 206, 208 above the first and second catalyst beds 114, 122, and flows downwardly therethrough in parallel to the connected plenums 210, 212 below the respective catalyst beds 114, 122. As needed, holes 136 in distributor plate 134 (see FIG. 6) between the plenum 206 and first catalyst bed 114 can be sealed, e.g. with blanking strips 215, so that the hole area per bed length is the same for both first and second catalyst beds 114, 122 to achieve an even distribution of feed gas thereto.

Another modification of the Peterson et al. reactor is the sealing off of the holes 46 and extension 218 (see FIG. 2) of the pipe 44 through the wall 124. The pipe extension 218 can be seal welded along the perimeter of a circular hole cut through the wall 124. This delivers the gas from the pipe 44 into the plenum 220 above the third catalyst bed 128.

Finally, the first and second catalyst beds 114, 122 are filled with conventional magnetite catalyst, preferably 1.5–3 mm. The third catalyst bed is preferably filled with high activity catalyst. If necessary, smaller screens can be overlaid on the supports of the catalyst beds 114, 122, 128.

The first wall 22, second wall 24 and gas transfer section 34 of the Peterson et al. reactor collectively form the first transverse partition for purposes of the present invention. The third wall 26 of Peterson et al. (appropriately modified to include flow windows 202, 204) is taken as the second transverse partition, and the partial wall 124 (appropriately sealed off) and/or partial wall 126 form the third transverse partition. The primary catalyst bed 114 and the first secondary bed 122 of the Peterson et al. reactor become the first and second primary catalyst beds in the present invention, gas flowing in parallel therethrough without interstage cooling. The second secondary catalyst bed 128 of Peterson et al. becomes the sole secondary bed of the present invention, containing high activity catalyst and receiving process gas from the primary magnetite catalyst beds 114, 122 after interstage cooling in the tubes 42.

In the present reactor 200 the outer shell S has a removable head 16 so that the inner shell or basket B may be removed for loading catalyst and for catalyst changes. Shell B is rolled into outer shell S by means of wheels 50 and 52 (see FIG. 3) attached to the end of shell B. Stops 54 and 56 correctly position the distance shell B enters the main body 10 of outer shell B. When shell B meets stops 54 and 56, jacks are placed on jack supports 58 and 60 to remove wheels 50 and 52. Rollers (not shown) on the outer surface of shell or basket B assist in maintaining basket B centered even when it expands on heating. The wheels are removed through manhole 62 at the end of main body 10. The shell B is then centered in shell S and locked into position by locks 64 and 66. The outlet pipe 48 comprises several sections. Section 68 has flanges 70 and 72 at each end respectively, which are connected by a person working within the main body 10. After securing shell B within shell S, the removable head 16 is secured. A person enters through manhole 74 in head 16 to connect a section 76 of the quench gas pipe 78. The quench gas pipe 78 extends at one end into the bottom of the heat exchange section 25 and has a plurality of openings 80. By diverting some of the inlet gas past the annular space between shells B and S, and past the heat transfer tubes 40, the quench gas pipe 78 can be used as a means for temperature control of the reactor 200. At the outer end of quench gas pipe 78 is an expansion joint 82 inside the head 16 before passage through inlet 18.

Referring to FIG. 4, which shows the details of the heat exchange section 25 and the gas transfer section 34, the fresh synthesis gas introduced through inlet 12 passes on the outer surface of inner shell B and through opening 40 defining a shell-side fluid inlet at the top of end wall 20. The gas enters heat exchange section 25. A plurality of tubes 42 extend from lower inlet tubesheet 84 and return to upper outlet tubesheet 86. Both tubesheet 84 and 86 are part of wall 22. Wall 22 and wall 24, together with gas transfer section 34, collectively constitute a first transverse partition between heat exchange section 25 and first catalyst bed 114. Surrounding the tubes 42 are retainer walls 88 and 90. Extending from end wall 20 are a plurality of baffles 92 (see FIG. 2). The gas entering heat exchange section 25 thus flows over tubes 42, because of the retainer walls 88 and 90 and the baffles 92, to the bottom of section 25. At the bottom of wall 22, within retainer walls 88 and 90, are two openings 94 and 96 defining a shell-side fluid outlet where the gas enters transfer section 34.

The gas transfer section 34 has a reduced internal cross-section 98. Preferably, cross-section 98 is cruciform, i.e. cross shaped. The internal cross-section 98 is divided by horizontal partition 100 into a lower portion 102 and an upper portion 104. The shape of lower portion 102 and upper portion 104 conforms to the shape of tube sheets 84 and 86, which are preferably rectangular. Extending from lower portion 102 is a portion 106 which extends to the inner wall of basket B. Likewise, upper portion 108 extends from upper portion 104 to the inner wall of basket B. Hence, the gas which passes through openings 94 and 96 passes externally of the reduced internal cross-section 98 from the bottom of gas transfer section 34 to the top where it passes through openings 110 and 112 in wall 24. The openings 110 and 112 open into plenum 206, above catalyst bed 114. Gas then enters plenum 208 through the flow window 202 and then passes in parallel through first and second catalyst beds 114, 122. The product gas from first and second catalyst beds 114, 122 passes from plenums 210, 212 which are connected by flow window 204 through opening 118 in wall 24 and through the portion 106, and then enters the tubes 42 through inlet tubesheet 84. The gas in tubes 42 is cooled by heat exchange with the fresh gas in heat exchange section 25. The cooled gas passes out of tubes 42 through exit tubesheet 86 and into upper portion 104. The gas then passes into portion 108 and through opening 120 of wall 24 into tube 44. The cooled gas passes through the walls 26 and 124 into plenum 220 above the third catalyst bed 128.

The gas may be distributed before passing through the catalyst beds 114, 122 and 128 by lower plates 130 (see FIG. 6) which have a larger number of larger openings 132 than in upper plate 134. The upper plate has a fewer number of smaller openings 136 which are positioned so that none are aligned with opening 132 in lower plate 130. A number of manhole plates 138, as shown in FIG. 6, permit access to the catalyst bed. Likewise, a number of manholes 140 in basket B (see FIG. 2) permit access to first catalyst bed section 28 and second catalyst bed section 32. When shell B is removed from shell S, easy access may be had to the catalyst beds to load or unload the catalyst.

The reactor 200 is thus easily made by retrofitting the Peterson et al. reactor. The modified reactor can use high activity catalyst in the secondary catalyst bed and has an increased ammonia conversion capacity. The catalyst beds 114, 122 are operated in parallel as one bed, with interstage cooling in the heat exchange section 25 before passing the gas through the secondary bed. The increase in primary bed catalyst volume by placing bed 122 in parallel with bed 114, and the increase in equivalent magnetite catalyst volume by use of high activity catalyst in the secondary bed, allows the modified reactor 200 to obtain a higher ammonia conversion percentage per pass and/or to process feed gas at a higher rate to increase ammonia production capacity.

The above description of the invention is merely illustrative and exemplary of the particular embodiments. Various modifications will become apparent to those skilled in the art. It is intended that all such modifications within the scope or spirit of the appended claims be embraced thereby.

What is claimed is:

1. A method for retrofitting a horizontal multi-bed ammonia converter comprising: (1) a horizontal cylindrical outer shell having a removable head at one end thereof; (2) a horizontal basket comprising a horizontal cylindrical inner shell having fore and aft end walls and defining an annular passage between the inner and outer shells; (3) a gas inlet through said outer shell in fluid communication with said annular passage; (4) a first transverse partition longitudinally spaced from said fore wall to define a heat exchange section therebetween having a plurality of tubes passing therethrough and a tube sheet adjacent to the first transverse partition, said heat exchange section having a shell-side fluid inlet and outlet for directing gas externally across said tubes, said shell-side fluid inlet in fluid communication with said annular passage; (5) a second transverse partition longitudinally spaced from said first transverse partition to define a first catalyst bed therebetween adapted for downward flow of gas therethrough; (6) a third transverse partition longitudinally spaced between the second transverse partition and the aft wall to define a second catalyst bed between said second and third transverse partitions and a third catalyst bed between said third partition and said aft wall, said second and said third catalyst beds adapted for downward flow of gas therethrough; (7) first, second and third upper and lower plenums above and below said respective catalyst beds defined by said inner shell and respective tops and bottoms of said catalyst beds; (8) a first passageway from said shell-side fluid outlet through said first transverse partition to said first upper plenum; (9) a second passageway from said first lower plenum through said first partition to a tube-side fluid inlet of said heat exchange section; (10) a third passageway from a tube-side fluid outlet of said heat exchange section through said first and second transverse partitions to said second upper plenum; (11) a fourth passageway from said second lower plenum through said third transverse partition to said third upper plenum; and (12) a gas outlet in fluid communication with the third lower plenum, comprising the steps of:

(a) forming flow windows through the second partition to establish fluid communication between the first and second upper plenums and between the first and second lower plenums;

(b) sealing off the fourth passageway;

(c) extending the third passageway through the third transverse partition to be in fluid communication with the third upper plenum and sealing off the third passageway with respect to the second upper plenum; and (d) filling the third catalyst bed with high activity catalyst.

2. The method of claim 1 further comprising the steps of:

(e) sealing holes in a distributor at the top of said first catalyst bed so that the hole area in said distributor per linear foot of length of said first catalyst bed is substantially the same as a hole area in a distributor at the top of said second catalyst bed per linear foot of length of said second catalyst bed.

3. The method of claim 1 wherein the first and second catalyst beds are filled with 1.5 to 3mm magnetite catalyst.

4. The method of claim 3 further comprising overlaying ed supports at the bottom of said first, second or third catalyst beds with smaller screens.

5. The method of claim 1 wherein said step (c) includes adding a short pipe extension to said third passageway, forming a hole through said third transverse partition to receive the short pipe extension and seal-welding the short pipe extension to the third transverse partition.

* * * * *